United States Patent
De Carbon et al.

(10) Patent No.: US 6,247,563 B1
(45) Date of Patent: Jun. 19, 2001

(54) PISTON WITH FLOATING VALVE FOR HYDRAULIC DAMPER TUBE, ESPECIALLY ONE OF THE MONOTUBE TYPE

(75) Inventors: Roland Bourcier De Carbon, Neuilly-sur-Seine; Eric Charleux, Autun, both of (FR)

(73) Assignee: Societe Francaise des Amortisseurs de Carbon, Saint-Pierre-du-Vauvray (FR)

( * ) Notice: Subject to any disclaimer, the term of this patent is extended or adjusted under 35 U.S.C. 154(b) by 0 days.

(21) Appl. No.: 08/735,258

(22) Filed: Oct. 22, 1996

(51) Int. Cl.[7] .................................. F16F 1/32; F16F 9/348

(52) U.S. Cl. ................................ 188/282.5; 188/322.15; 188/282.6; 188/322.22

(58) Field of Search ........................ 188/322.15, 322.22, 188/317, 281, 282, 280, 282.5, 282.6, 282.8, 282.1; 267/161, 162; 411/535, 544, 156, 155; 137/854, 856, 493.8, 493, 513.3, 504, 855

(56) References Cited

U.S. PATENT DOCUMENTS

| | | | |
|---|---|---|---|
| 2,987,146 | * 6/1961 | Allinquant | 188/317 |
| 3,107,905 | * 10/1963 | Lucas | 267/161 |
| 3,312,312 | * 4/1967 | De Carbon. | |
| 3,430,648 | * 3/1969 | Botkih. | |
| 3,553,429 | * 1/1971 | Dickinson. | |
| 3,592,164 | * 7/1971 | Schultze. | |
| 3,682,466 | * 8/1972 | Huchette et al. | 267/161 |
| 3,791,407 | * 2/1974 | Nicholls. | |
| 3,831,626 | * 8/1974 | Ullrich. | |
| 3,844,389 | * 10/1974 | De Carbon. | |

(List continued on next page.)

FOREIGN PATENT DOCUMENTS

| | | | |
|---|---|---|---|
| 58973 | * 1/1912 | (CH) | 411/155 |
| 472601 | * 11/1967 | (CH) | 188/317 |
| 958 532 | 2/1957 | (DE). | |
| 2804213 | * 8/1979 | (DE) | 267/161 |
| 4139746 | * 6/1993 | (DE) | 188/322.15 |
| 07602013 | * 2/1997 | (EP). | |
| 2 320 466 | 3/1977 | (FR). | |
| 2 693 524 | 1/1994 | (FR). | |
| 311754 | * 7/1929 | (GB) | 188/317 |
| 311754 | 8/1929 | (GB). | |
| 2225409 | * 5/1990 | (GB) | 188/322.15 |
| 51-149475 | 4/1977 | (JP). | |
| 231040 | * 2/1990 | (JP) | 188/322.22 |
| 3157533 | * 7/1991 | (JP) | 188/322.15 |
| 555243 | * 6/1977 | (SU) | 267/161 |
| 1201580 | * 12/1985 | (SU) | 267/161 |
| 1733757 | * 5/1992 | (SU) | 267/161 |
| 85/00209 | 1/1985 | (WO). | |

OTHER PUBLICATIONS

Patent Abstracts of Japan, vol. 7, No. 189 (M–237), JP 58 091945, Aug. 1983.

Revue Techniquie Automobile, vol. 47, No. 538, Apr. 1992, Une Reussite Basee Sur L'Invention, pp. 30–32.

Patent Abstracts of Japan, vol. 1, No. 40 (M–16), JP 51 149475, Apr. 1977, Tokico Ltd.

Tool Engineers Handbook, pp. 1834–1836, First Edition, 1949.

*Primary Examiner*—Douglas C. Butler
(74) *Attorney, Agent, or Firm*—Smith, Gambrell & Russell

(57) ABSTRACT

The piston with a valve for a hydraulic damper tube, comprises a piston body (116) having a fluid passage (112) interacting with a floating valve element (115) for controlling in both directions the amount of fluid flowing through the passage. The floating valve element includes a spring washer (115), the deflection (f) of which in the free state is between approximately 0.1 times and approximately 2 times the thickness (e) of the washer.

12 Claims, 4 Drawing Sheets

U.S. PATENT DOCUMENTS

Figure 1:
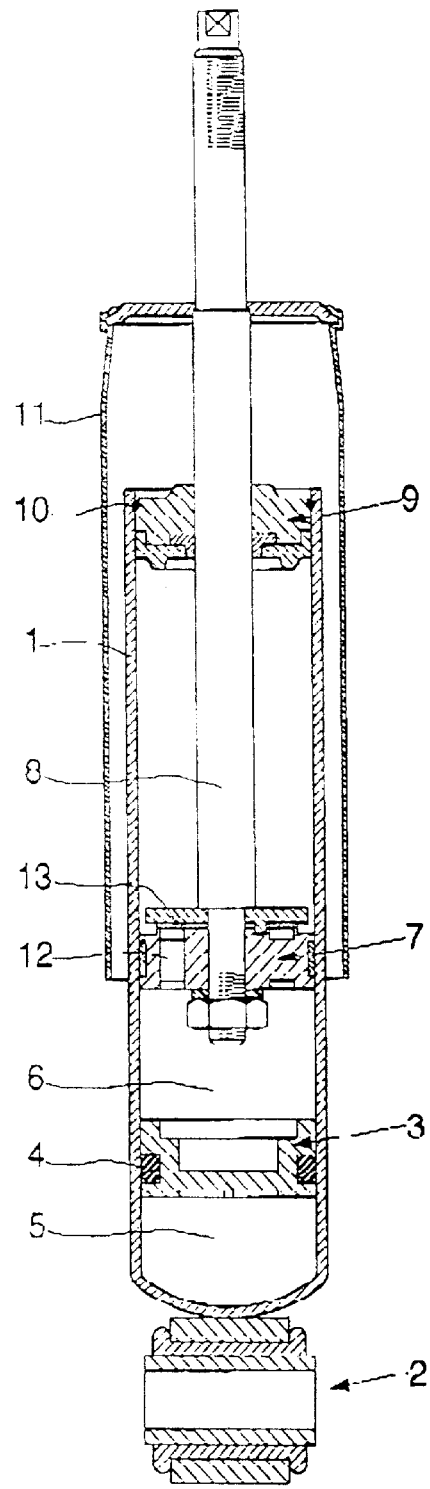

| | | | |
|---|---|---|---|
| 3,845,782 | * | 11/1974 | Nicholls et al. ............... 137/493 |
| 3,951,393 | * | 4/1976 | Smirl ............... 267/161 |
| 3,957,140 | * | 5/1976 | Josef . |
| 3,991,862 | * | 11/1976 | Tanabe . |
| 4,027,865 | * | 6/1977 | Greenwood et al. ............... 267/161 |
| 4,031,936 | * | 6/1977 | Curtis ............... 411/544 |
| 4,045,009 | * | 8/1977 | Peas . |
| 4,060,155 | * | 11/1977 | Duckett . |
| 4,111,231 | * | 9/1978 | Leppich . |
| 4,241,815 | * | 12/1980 | Federspiel ............... 137/493 |
| 4,460,074 | * | 7/1984 | Müller et al. . |
| 4,512,447 | * | 4/1985 | Miura ............... 188/322.15 |
| 4,610,332 | | 9/1986 | Mourray . |
| 4,615,420 | * | 10/1986 | Mourray . |
| 4,624,347 | * | 11/1986 | Mourray . |
| 4,724,937 | * | 2/1988 | Fannin et al. . |
| 4,790,704 | * | 12/1988 | Temple et al. ............... 411/544 |
| 4,819,773 | * | 4/1989 | Ito et al. ............... 188/317 |
| 4,895,229 | * | 1/1990 | Kato ............... 188/317 |
| 4,899,855 | * | 2/1990 | De Carbon et al. . |
| 4,964,493 | * | 10/1990 | Yamaura et al. ............... 188/322.15 |
| 4,972,929 | * | 11/1990 | Ivers et al. ............... 188/322.15 |
| 5,072,812 | * | 12/1991 | Imaizumi ............... 188/317 |
| 5,085,300 | * | 2/1992 | Kato et al. ............... 188/317 |
| 5,112,178 | * | 5/1992 | Overhues et al. ............... 411/544 |
| 5,154,263 | * | 10/1992 | Lizell . |
| 5,325,942 | * | 7/1994 | Grover et al. ............... 188/322.15 |
| 5,332,069 | * | 7/1994 | Murakami ............... 188/317 |
| 5,496,142 | * | 3/1996 | Fodor et al. ............... 411/544 |
| 5,529,154 | * | 6/1996 | Tanaka ............... 188/322.15 |
| 5,755,305 | * | 5/1998 | Deferme et al. . |
| 5,823,306 | * | 10/1998 | De Moliha . |
| 6,116,388 | * | 9/2000 | Bataille et al. . |

* cited by examiner

PISTON WITH FLOATING VALVE FOR HYDRAULIC DAMPER TUBE, ESPECIALLY ONE OF THE MONOTUBE TYPE

The invention relates to the pistons of hydraulic dampers, especially those of the pressurized monotube type.

A hydraulic damper includes a piston which can slide inside a tube in order to divide the internal space thereof into two chambers filled with fluid. A through passage is provided within the piston in order to place the two chambers in communication, and interacts with a valve system governing the opening of the passage as a function of the flow of fluid which depends on whether the damper is in a phase of extension or one of compression.

A suspension system can usually be characterized on the basis of a curve giving the force exerted on the damper as a function of the rate of travel of the piston inside it. At the present time, the classical curves deviate, both in the phase of extension and in the phase of compression, from the theoretical damping straight line to follow a progression which is substantially linear but with a rapid deflection on entering the compression phase to end up with a relative stabilization of the force irrespective of the value of the speed.

Now, especially for some types of vehicle, it has been observed that better comfort would require the application of forces which are lower than those which result from the classical damping laws, particularly at high speeds, typically above 0.5 m/s.

The invention aims to provide a solution to this problem, particularly for dampers the piston of which is equipped with a floating valve which is well known to those skilled in the art, in which the same passage paths are used for the flow of fluid in both directions, whereas in other types of hydraulic damper separate flow paths are provided for the compression phase and for the extension phase.

The invention therefore proposes a piston with valve for a hydraulic damper tube, comprising a piston body having a fluid passage interacting with a floating valve element for controlling in both directions the amount of fluid flowing through the passage. According to a general characteristic of the invention, the floating valve element includes a spring washer, the deflection of which in the free state is between approximately 0.1 times and approximately 2 times the thickness of the said washer.

In other words, whereas in conventional pistons with valves the floating valve includes a washer which, as far as manufacturing tolerances allow, is flat, the invention on the other hand envisages forming this floating valve from a spring washer which has a pre-determined deflection in the free state in the context of the present invention, "deflection in the free state" is understood to be the deflection of the washer when it is not mounted on the piston.

The use of such a spring washer makes it possible to obtain a damping law which has one or two points of inflection in the phase of compression and/or of extension.

In other words, such a low lies within the classical damping laws and, especially in the extension phase, has a substantially flat region. The invention therefore makes it possible to reduce the force exerted on the damper at high speeds, and this improves the ride comfort for certain types of vehicles, while at the same time making it possible not to reduce the force excessively at moderate speeds (typically between 0.1 m/s and 0.5 m/s).

It has been observed that a spring washer cone height of less than 0.1 times the thickness does not substantially alter the damping law, whereas at more than twice the thickness there is a risk of the spring washer becoming inverted and thus leading to a malfunction of the floating valve.

A deflection approximately equal to the thickness of this washer has given satisfactory results, in particular good endurance behaviour.

The spring washer may also be preloaded, that is to say that its deflection when mounted on the piston is less than its deflection in the free state. This preload can be obtained by arranging at least one annular shimming plate of chosen thickness between the piston body and a central annular plate supporting an upper annular plate protruding slightly beyond the central plate and against the free edge of which the said spring washer bears.

Another subject of the invention is a spring washer for the floating valve of a hydraulic damper, as defined earlier.

Figure 2:
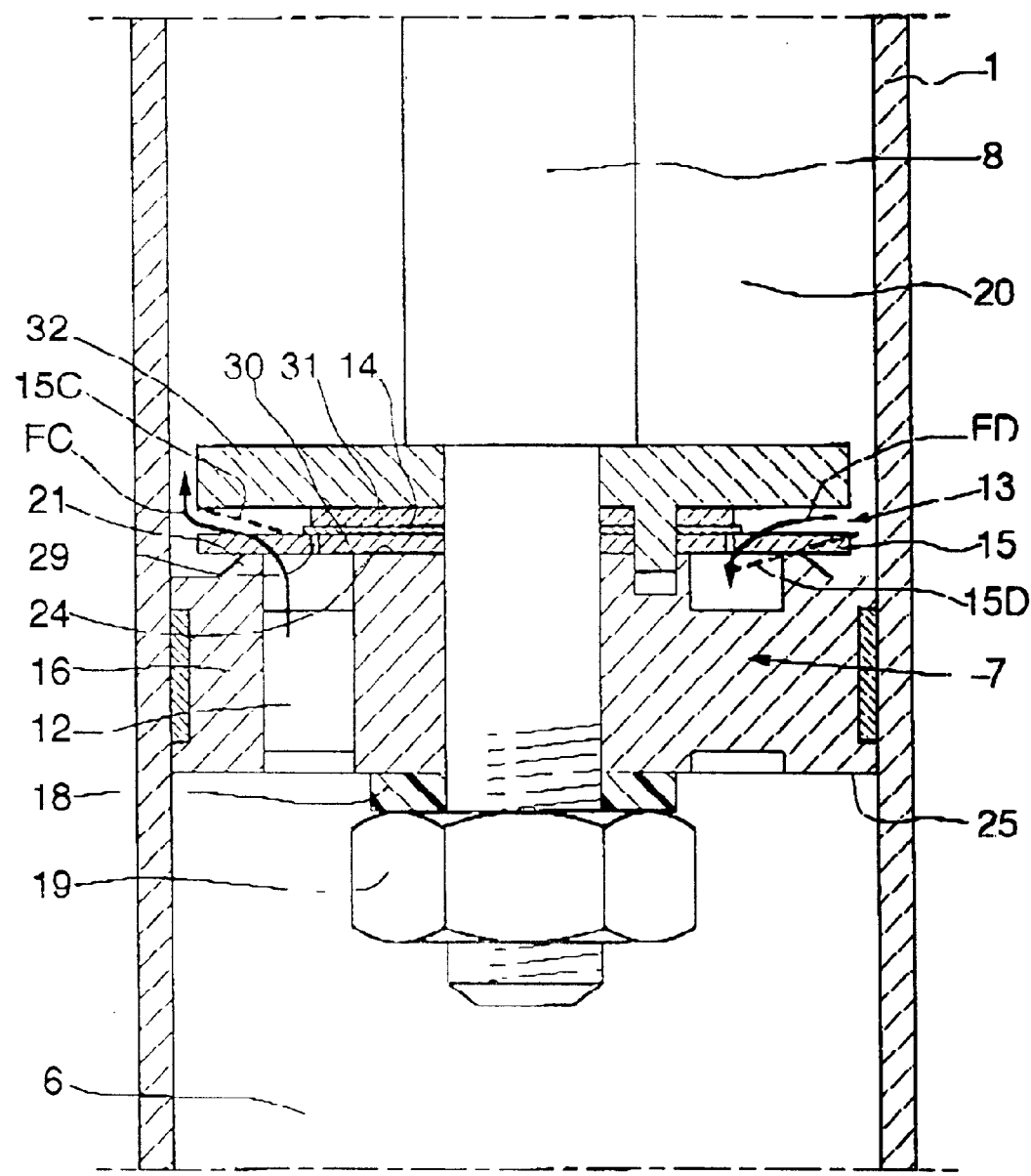
Figure 3:
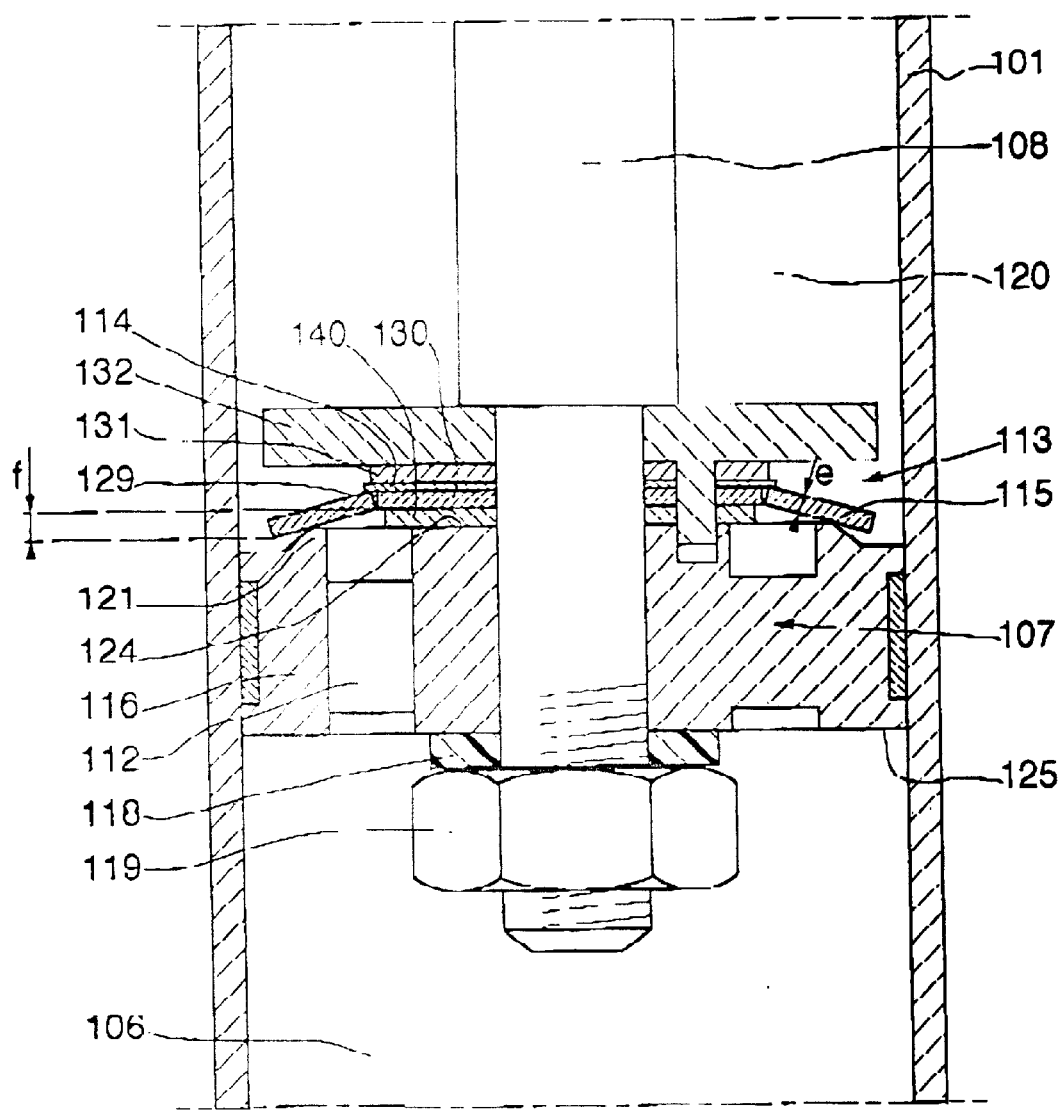
Figure 4:
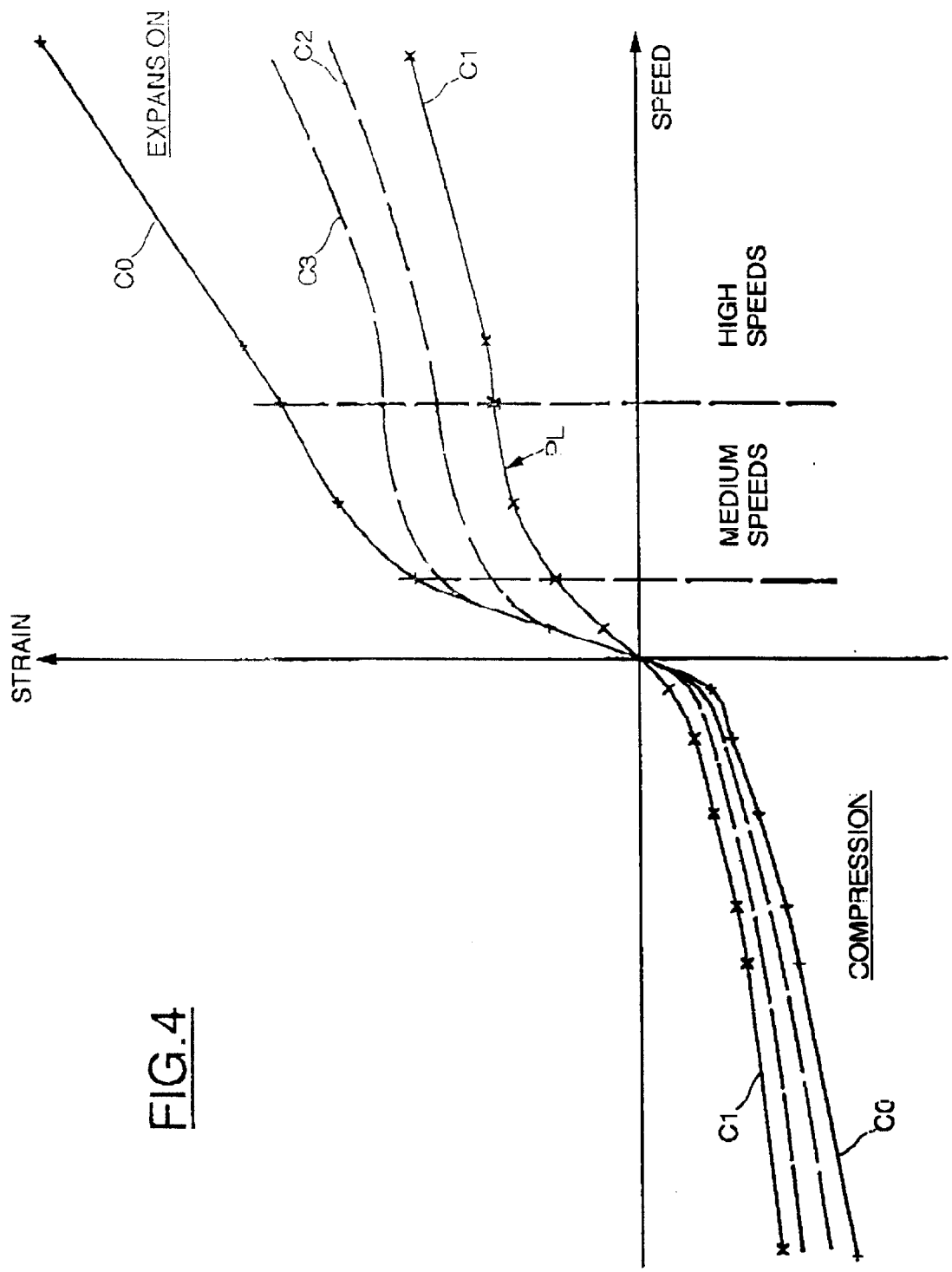

Other advantages and characteristics of the invention will become clear on examining the detailed description of a non-limiting embodiment and the attached drawings, in which:

FIG. 1 is a longitudinal section through a damper tube equipped with a piston with floating valve according to the prior art, FIG. 2 is a more detailed view of the piston with floating valve of FIG. 1, FIG. 3 is a view in section of a piston with floating valve according to the invention, and FIG. 4 illustrates various damping laws.

As it is illustrated in FIG. 1, the monotube telescopic hydraulic damper comprises a cylinder tube 1 fastened at one of its ends by an eye 2. A piston 3 which separates gas from liquid, mounted so that it can slide freely inside the cylinder 1, is fitted with an O-ring seal 4 and divides the cylinder into two portions. One portion 5 contains a pressurized gas and the other portion 6 is filled with hydraulic fluid. Another piston 7 is fastened to the end of a rod 8 the movement of which inside the cylinder is guided by the guide 9 fastened to the cylinder by a fastening means 10.

The upper end of the rod 8 is fastened to a fastening stud.

The damper is supplemented by a protection element 11 secured to the rod 8 and covering part of the cylinder 1.

For the damper to work, the piston 7 includes permanent passages 12 for the hydraulic fluid, these interacting with a valve which is said to be floating.

As illustrated in FIG. 2, the piston 7 includes a piston body 16 of cylindrical overall shape which is capable of sliding within the tube 1 and has a plurality of cavities, for example eight of these, emerging on each side of the piston body. These cavities define the permanent passage 12 for the hydraulic fluid between the upper chamber 20 and the lower chamber 6.

The left-hand part of this figure is a longitudinal section in the plane of symmetry of a cavity, while the right-hand part is a longitudinal section taken between two cavities. Although each cavity constitutes a two-way passage path for the fluid, the left hand part of the figure illustrates, using dashes, the configuration of the floating valve in the compression phase while the right-hand part illustrates, using dashes, the configuration in the phase of relaxation or of extension.

The valve system 13, said to be a floating system, is arranged on the upper face 24 of the piston body 16 and includes, in the conventional way, a central annular plate 30 surrounded by a ring 15 (the floating valve element proper) which rest bearing, on the one hand, on a shoulder 21 of the piston body and, on the other hand, against the free edge of an upper plate 14 situated on the central plate 30 and protruding slightly beyond the latter. Arranged on the upper plate 14 is another plate 31, this stack of plates being sandwiched between the upper face 24 of the piston and an upper fastening plate 32 including two pegs fastened into the piston body.

The flat ring 15 and the central plate together define a space 29. This ring 15 can be deflected into the position 15C in the phase of compression of the damper so that it becomes detached from the shoulder 21 of the piston and allows fluid to pass in the direction of the arrow FC. In the extension phase, the ring 15 is oriented into the position 15D, becoming detached from the upper plate 14 to allow the fluid to pass in the direction of the arrow FD.

Whereas in this piston of the prior art illustrated in FIG. 2 the ring 15 is, as far as manufacturing tolerances allow, flat, the invention as illustrated in FIG. 3 on the other hand envisages the use of a floating valve system 113 which includes a spring washer 115 (the floating valve element proper), of which the deflection in the free state lies between approximately 0.1 times and approximately 2 times the thickness of the said washer 115.

In FIG. 3, which illustrates one embodiment of the piston with valve according to the invention, elements which are similar or have functions which are similar to those illustrated in FIG. 2 have references increased by 100 with respect to those which they had in this FIG. 2. Only the differences between these two figures will now be described.

The spring washer 115 comes to bear, on the one hand, on the shoulder 121 of the piston body 116 and, on the other hand, against the free edge of the upper annular plate 114 which protrudes slightly beyond the central plate 130. In the compression phase, as with the case of a flat washer, the washer 115 is deflected so that it detaches from the shoulder 121 of the piston and allows the fluid to pass. In the extension phase, the washer 115 detaches from the upper plate 114.

The deflection $t$ of the spring washer 115 can be measured as the axial distance between the lower and upper edges of one and the same face of the washer. If the deflection $f$ of this washer is less than 0.1 times its thickness $e$, then there is practically no perceivable improvement in comfort. If this deflection $f$ is greater than twice the thickness $e$, there is then a risk of the spring washer 115 becoming inverted. In other words, there is a risk of the washer 115 becoming detached for good from the free edge of the upper plate 114 to be oriented towards the lower face 125 of the piston and leave a permanent free space for the fluid, which would cause the valve not to work.

In order to keep a cone angle of the washer 115 when it is mounted between the upper plate 114 and the shoulder 21, provision is made for at least one annular chimming plate 140 of chosen thickness to be arranged between the central plate 130 and the upper face 124 of the piston 124.

The thickness of this shimming plate 140 makes it possible, depending on its value, to obtain a deflection $f$ in the "mounted" state which is equal to the deflection $f$ in the "free" state, or alternatively to obtain a deflection in the "mounted" state which is less than the deflection in the "free" state, that is to say that it is possible to preload the washer 115.

In theory, it should also be possible to dispense with the plate 140 in order to make the spring washer 115 substantially flat in the "mounted " state.

Of course the same effects could be obtained by replacing the annular shimming plate by a central plate 130 of greater or smaller thickness, or by a special configuration of the upper face of the piston.

The spring washer 115 may be made of any material having a high elastic limit, such as metal alloys, composite materials or ceramics. For example, steel with an elastic limit of between 1000 and 1300 $N/mm^2$ may be used.

The typical dimensions of the elastic spring washer are, as regards the thickness, from 0.1 to 5 mm, as regards the inside diameter, from 10 to 50 mm and as regards the outside diameter, from 15 to 70 mm. As far as the deflection is concerned, a value of 1 times the thickness has the additional advantage of giving the valve good endurance behaviour.

In FIG. 4, the curve C0 illustrates a damping law obtained with a floating valve of the type illustrated in FIG. 2, while the curve C1 illustrates the damping law obtained with a spring-washer floating valve like the one illustrated in FIG. 3.

It is observed that the curve C1 lies inside the curve C0 which, for the same speed, corresponds to lower forces on the damper. What is more, above and beyond a certain speed, especially in the relaxation phase, the curve C1 has a substantially flat region PL in which an increase in speed corresponds to a very minimal increase in the force exerted on the damper. This plateau PL, which leads to a point of inflection being obtained, makes it possible for the force not to be reduced excessively at moderate speed, while at the same time guaranteeing a reduction in force at high speed.

The preload on the spring washer makes it possible to alter the damping law, especially at low speeds, while at the same time preserving the plateau region, as illustrated by curves C2 and C3.

What is claimed is:

1. Piston with valve for hydraulic damper tube, comprising a piston body having a fluid passage interacting with a floating valve element for controlling in both directions the amount of fluid flowing through the passage, said floating valve element including a spring washer having a thickness, said spring washer having a face which has an upper edge and a lower edge, said spring washer having a deflection which changes in response to loading and is the axial distance between the upper and lower edges, said deflection being oriented such that the deflection decreases during an expansion phase state of the piston, said deflection in an unloaded free state being between approximately 0.1 times and approximately 2 times the thickness of said washer.

2. Piston according to claim 1, wherein the spring washer is preloaded.

3. Piston with valve for hydraulic damper tube, comprising a piston body having a fluid passage interacting with a floating valve element for controlling in both directions the amount of fluid flowing through the passage, said floating valve element including a spring washer having a thickness, said spring washer having a face which has an upper edge and a lower edge, said spring washer having a deflection which changes in response to loading and is the axial distance between the upper and lower edges, said deflection in an unloaded free state being between approximately 0.1 times and approximately 2 times the thickness of said washer;

the body of the piston supporting a stack of plates including a central annular plate and an upper annular plate which is supported by the central annular plate and protrudes slightly beyond the central plate, said spring washer bearing against the body of the piston and against the free edge of the upper annular plate, said washer being deflectable when the damper is in a phase of compression so that the washer detaches from the body of the piston, said washer when in a phase of relaxation being detachable from the upper plate.

4. Piston according to claim 3, wherein the piston comprises at least one annular shimming plate of chosen thickness arranged between the central annular plate and the piston body.

5. Piston according to claim 3, wherein the spring washer is preloaded.

6. Piston according to claim 3, comprising at least one annular shimming plate between the central annular plate and the piston body.

7. Piston according to claim 6, wherein the piston comprises at least one annular shimming plate of chosen thickness arranged between the central annular plate and the piston body.

8. Piston with valve for hydraulic damper tube, comprising a piston body having a fluid passage interacting with a floating valve element for controlling in both directions the amount of fluid flowing through the passage, said floating valve element including a spring washer having a thickness, said spring washer having a face which has an upper edge and a lower edge, said spring washer floating on said piston body so that said upper edge and said lower edge are movable relative to said piston body, and spring washer having a deflection which changes in response to loading and is the axial distance between the upper and lower edges, said deflection being oriented such as that said deflection decreases during an expansion phase state of the piston, said deflection in an unloaded free state being between approximately 0.1 times and approximately 2 times the thickness of said washer.

9. Piston according to claim 8, wherein the spring washer is preloaded.

10. Piston according to claim 8, wherein the body of the piston supports a stack of plates including a central annular plate, an upper annular plate which is supported by the central annular plate and protrudes slightly beyond the central plate, said spring water bearing against the body of the piston and against the free edge of the upper annular plate, said washer being deflectable when the damper is in a phase of compression so that the washer detaches from the body of the piston, said washer when in a phase of relaxation being detachable from the upper plate.

11. Piston according to claim 10, wherein the piston comprises at least one annular shimming plate of chosen thickness arranged between the central annular plate and the piston body.

12. Piston according to claim 10, wherein the spring washer is preloaded.

* * * * *